US009488837B2

(12) United States Patent
Nister et al.

(10) Patent No.: US 9,488,837 B2
(45) Date of Patent: Nov. 8, 2016

(54) NEAR EYE DISPLAY

(71) Applicant: MICROSOFT TECHNOLOGY LICENSING, LLC, Redmond, WA (US)

(72) Inventors: David Nister, Bellevue, WA (US); Georg Klein, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/931,464

(22) Filed: Jun. 28, 2013

(65) Prior Publication Data
US 2015/0002940 A1 Jan. 1, 2015

(51) Int. Cl.
*G02B 27/01* (2006.01)
*G02B 27/00* (2006.01)
*G02B 3/00* (2006.01)

(52) U.S. Cl.
CPC ......... *G02B 27/0172* (2013.01); *G02B 3/0037* (2013.01); *G02B 27/01* (2013.01); *G02B 27/017* (2013.01); *G02B 27/0093* (2013.01); *G02B 2027/014* (2013.01); *G02B 2027/0178* (2013.01)

(58) Field of Classification Search
CPC . G02B 27/01; G02B 27/0172; G02B 3/0037
USPC ............ 359/619–640, 676, 680–682
See application file for complete search history.

(56) References Cited

U.S. PATENT DOCUMENTS

| 6,967,761 | B2 * | 11/2005 | Starkweather et al. ...... 359/291 |
| 8,079,713 | B2 | 12/2011 | Ashkenazi |
| 8,416,289 | B2 | 4/2013 | Akeley |
| 2005/0083516 | A1 * | 4/2005 | Baker .................. G02B 27/225 356/124 |

(Continued)

FOREIGN PATENT DOCUMENTS

EP 2306230 B1 12/2011
EP 2447758 A1 5/2012

(Continued)

OTHER PUBLICATIONS

Gunther Haas, A 5.4 MDOT OLED microdisplay for digital night vision and image fusion, Proc. SPIE 8383, Head- and Helmet-Mounted Displays XVII; and Display Technologies and Applications for Defense, Security, and Avionics VI, 83830B (May 22, 2012).*

(Continued)

*Primary Examiner* — Thomas K Pham
*Assistant Examiner* — Mitchell Oestreich
(74) *Attorney, Agent, or Firm* — Dave Ream; Tom Wong; Micky Minhas

(57) ABSTRACT

A system and related methods for near-eye display of an image are provided. In one example, a near-eye display system includes a light source comprising a surface and a plurality of pixels having a pixel pitch of 5 microns or less. An aperture array is located between 2 mm and 5 mm from the surface of the light source. The aperture array comprises non-overlapping apertures that are each centered on a vertex of an equilateral triangle within a grid of equilateral triangles. The center of each aperture is spaced from the center of each adjacent aperture by an aperture spacing of between 1 mm and 9 mm. The aperture array selectively passes the light emitted from the pixels to display the image without a double image condition.

22 Claims, 8 Drawing Sheets

(56) References Cited

U.S. PATENT DOCUMENTS

| | | | |
|---|---|---|---|
| 2009/0185107 A1* | 7/2009 | Panagotacos et al. | 349/64 |
| 2009/0189830 A1 | 7/2009 | Deering et al. | |
| 2010/0110368 A1 | 5/2010 | Chaum | |
| 2010/0149073 A1 | 6/2010 | Chaum et al. | |
| 2011/0134017 A1 | 6/2011 | Burke | |
| 2011/0241976 A1 | 10/2011 | Boger et al. | |
| 2012/0154920 A1* | 6/2012 | Harrison et al. | 359/619 |
| 2012/0188148 A1* | 7/2012 | DeJong | 345/8 |
| 2012/0212399 A1 | 8/2012 | Border et al. | |
| 2012/0212499 A1 | 8/2012 | Haddick et al. | |
| 2012/0218490 A1 | 8/2012 | Takama et al. | |
| 2013/0016292 A1 | 1/2013 | Miao et al. | |
| 2013/0021226 A1 | 1/2013 | Bell | |
| 2013/0050070 A1 | 2/2013 | Lewis et al. | |
| 2013/0051730 A1 | 2/2013 | Travers et al. | |

FOREIGN PATENT DOCUMENTS

| | | | | |
|---|---|---|---|---|
| JP | 10170860 A * | 6/1998 | | G02B 27/02 |
| WO | 9908150 A1 | 2/1999 | | |
| WO | 0248755 A2 | 6/2002 | | |
| WO | 2008055262 A2 | 5/2008 | | |

OTHER PUBLICATIONS

P Pantelis and D J McCartney, Polymer microlens arrays, Pure Appl. Opt. 3 (1994) 103-108.*
ISA European Patent Office, International Search Report and Written Opinion Issued in Application No. PCT/US2014/043749, Sep. 23, 2014, WIPO, 11 Pages.
Pylvanainen, et al.,"Gaze Tracking for Near to Eye Displays", Retrieved at <<http://www.ic-at.org/ICAT2008_Proceedings/Papers/PS1_1.pdf>>, Dec. 1, 2008, pp. 7.
"Interaction Via Gaze", Retrieved at <<http://research.nokia.com/page/4861>>, Retrieved Date: Apr. 3, 2013, p. 1.
"Human Eye", Retrieved at <<http://research.nokia.com/page/4861>>, Retrieved Date: Apr. 3, 2013, pp. 13.
Viirre, et al.,"Laser Safety Analysis of a Retinal Scanning Display System", In Journal of Laser Applications, Apr. 3, 2013, pp. 13.
"Creative Technology Lasers", Retrieved at <<http://www.laser66.com/html/APCMod.html>>, Retrieved Date: Apr. 3, 2013, pp. 3.
"Mirrorcle Technologies", Retrieved at <<http://mirrorcletech.com/devices.html>>, Retrieved Date: Apr. 3, 2013, pp. 2.
"Oculus Rift", Retrieved at <<http://en.wikipedia.org/wiki/Oculus_Rift>>, Retrieved Date: Apr. 3, 2013, pp. 8.
"Fresnel lens", Retrieved at <<http://en.wikipedia.org/wiki/Fresnel_lens>>, Retrieved Date: Apr. 3, 2013, pp. 2.
"Lenticular lens", Retrieved at <<http://en.wikipedia.org/wiki/Lenticular_lens>>, Retrieved Date: Apr. 3, 2013, pp. 5.
"Array Structures for Beam Shaping", Retrieved at <<http://www.ingeneric.com/en/micro-lens_arrays/>>, Retrieved Date: Apr. 3, 2013, p. 1.
Parviz, Babak A.,"Augmented Reality in a Contact Lens", Retrieved at <<http://spectrum.ieee.org/biomedical/bionics/augmented-reality-in-a-contact-lens/0>>, Sep. 2009, pp. 6.
"Light field", Retrieved at<<http://en.wikipedia.org/wiki/Light_field>>, Retrieved Date: Apr. 3, 2013, pp. 7.
Rivington, James,"Philips to Launch Glasses-Free 3D TV in 2013", Retrieved at <<http://www.techradar.com/news/television/hdtv/philips-to-launch-glasses-free-3d-tv-in-2013-713951>>, Sep. 2, 2010, pp. 5.
"Microoled", Retrieved at <<http://www.microoled.net/>>, Retrieved Date: Apr. 3, 2013, pp. 5.
"Packing Problem", Retrieved at <<http://en.wikipedia.org/wiki/Packing_problem>>, Retrieved Date: Apr. 3, 2013, pp. 8.
"Retina Display", Retrieved at <<http://en.wikipedia.org/wiki/Retina_display, Retrieved Date: Apr. 3, 2013, pp. 3.
"Equilateral Triangle", Retrieved at <<http://en.wikipedia.org/wiki/Equilateral_triangle>>, Retrieved Date: Apr. 3, 2013, pp. 7.
"Lens (optics)", Retrieved at <<http://en.wikipedia.org/wiki/Lens<<makers<<equation>>, Retrieved Date: Apr. 3, 2013, pp. 12.
"Pinhole Glasses", Retrieved at <<http://en.wikipedia.org/wiki/Pinhole_glasses>>, Retrieved Date: Apr. 3, 2013, pp. 2.
Guenter, et al., "Foveated 3D Graphics", In Proceedings of ACM Transactions on Graphics, vol. 31, No. 6, Nov. 20, 2012, pp. 10.
Guenter, et al., "Foveated 3D Display", In Proceedings of ACM SIGGRAPH Asia, Nov. 20, 2012, pp. 10.
"List of Refractive Indices", Retrieved at <<http://en.wikipedia.org/wiki/List_of_refractive_indices>, Retrieved Date: Apr. 3, 2013, pp. 8.
Johnson, R. Barry, "Advances in Lenticular Lens Arrays for Visual Display" In Proceedings of SPIE, vol. 5874, Aug. 2005, pp. 11.
"Diffraction", Retrieved at <<http://en.wikipedia.org/wiki/Diffraction>>, Retrieved Date: Apr. 4, 2013, pp. 6.
"Diffraction-Limited System", Retrieved at <<http://en.wikipedia.org/wiki/Diffraction_limit>>, Retrieved Date: Apr. 4, 2013, pp. 4.
Sheedy J., et al., "Performance and Comfort on Near-Eye Computer Displays", In Journal of Optometry and Vision Science, vol. 79, Issue 5, May 2002, 7 pages.
IPEA European Patent Office, International Preliminary Report on Patentability Issued in PCT Application No. PCT/US2014/043749, Jul. 10, 2015, WIPO, 10 Pages.
IPEA European Patent Office, Written Opinion Issued in PCT Application No. PCT/US2014/043749, Apr. 17, 2015, WIPO, 6 Pages.

* cited by examiner

NEAR EYE DISPLAY

BACKGROUND

Head-mounted display devices offer the promise of enabling new human-computer interaction paradigms in a variety of fields such as gaming, aviation, engineering, science, and medicine, through a wearable device that is convenient for the user to selectively engage. One constraint with such devices, however, is that the human eye cannot focus on a point source located approximately 10 centimeters (cm) or less away from the eye. For this reason, head-mounted displays may utilize optical elements or waveguides in front of the eye, which results in a thicker and more bulky device than is desired. In these devices, user comfort, device mobility, and device aesthetics are often compromised.

Another possible display system for head-mounted display devices is a retinal scanning laser. Such a solution may also utilize elements in front of the eye, such as a mirroring surface, waveguide, or a steerable mirror. One example may be a laser diode mounted near a user's temple to direct a light beam to a steerable micro-mirror that scans the beam. The scanned beam may be reflected via one or more other mirrors into the eye. In another example, the steerable micro-mirror may be positioned in front of the eyes and may reflect the beam directly into the eyes.

A problem with locating a steerable micro-mirror in front of the eye is that it limits the user's field of view, since a mirror near the eye has to be relatively large to cover the range of rotation of the eye. Devices with a laser diode mounted near the temple suffer a similar problem, in that the mirroring surface is necessarily strongly convex to enable the beam to enter the pupil from a wide range of angles. Such a constraint is difficult to address for a range of pupil positions. This is especially true given the possibility of occlusion of the beam by the user's head.

Another possibility may be to use a non-standard lens-type such as a Fresnel lens. However, Fresnel senses are designed for use by a viewer that is far away relative to the diameter of the lens. Lenticular lenses or lens arrays may also be considered. Lenticular lenses are typically utilized to provide an angular dependence and stereo effect to prints. Lenticular printing works for distances at which the eye can focus, but adds an angular dependency, typically in the horizontal direction. Furthermore, if viewing is attempted from a close range, the image would be blurry at least in the vertical direction.

SUMMARY

To address the above issues, a near-eye display system including a light source and aperture array and related methods are provided. In one example, a near-eye display system may include a light source comprising a surface and a plurality of pixels having a pixel pitch of 5 microns or less, wherein the pixels are configured to emit light comprising an image. An aperture array is located between 2 millimeters (mm) and approximately 5 mm from the surface of the light source.

The aperture array comprises a plurality of non-overlapping apertures that are each centered on a vertex of an equilateral triangle within a grid of equilateral triangles. A center of each of the apertures is spaced from a center of each adjacent aperture by an aperture spacing of between 1 mm and 9 mm. The aperture array selectively passes the light emitted from the pixels to display the image without a double image condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Figure 1:
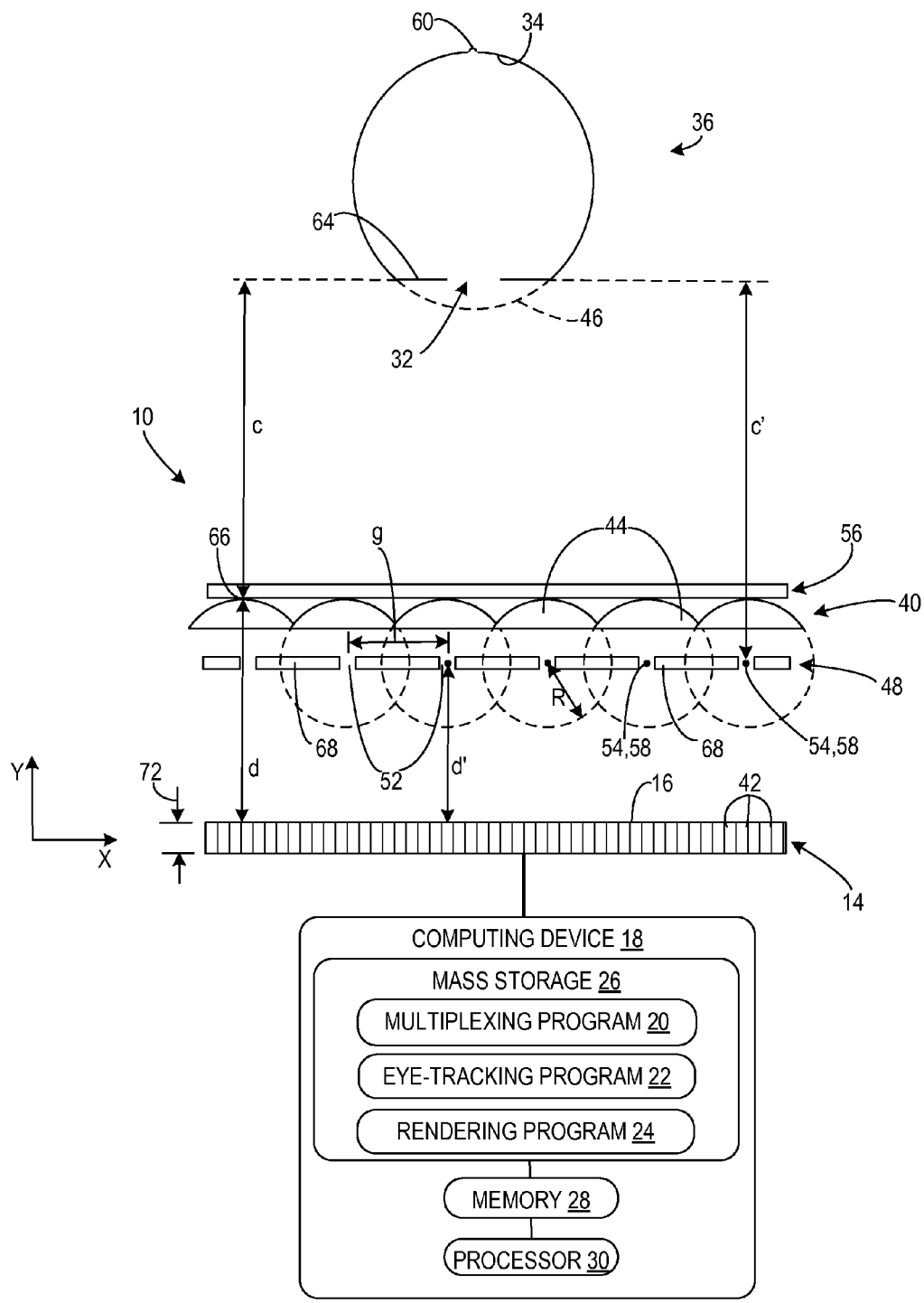
FIG. 1 is a schematic illustration of a top view of a near-eye display system according to an embodiment of the present disclosure.

It will be appreciated that the particular components, features, distances, and layouts shown in the drawings are not shown to scale with respect to one another, and are illustrated for ease of description.

DETAILED DESCRIPTION

FIG. 1 shows a schematic top view of one embodiment of a near-eye display system 10 according to an embodiment of the present disclosure. As described in more detail below, the near-eye display system 10 shown in FIG. 1 includes a light source 14, an openings array 48 of non-overlapping openings 52 within a substrate 68, a lens array 40 of non-overlapping lenses 44, and a standoff surface 56. Each of the openings array 48 and lens array 40 selectively passes light emitted from the light source 14 through the pupil 32 to the retina 34 of an eye 36, to thereby display an image on the retina without a double image condition.

Figure 4:
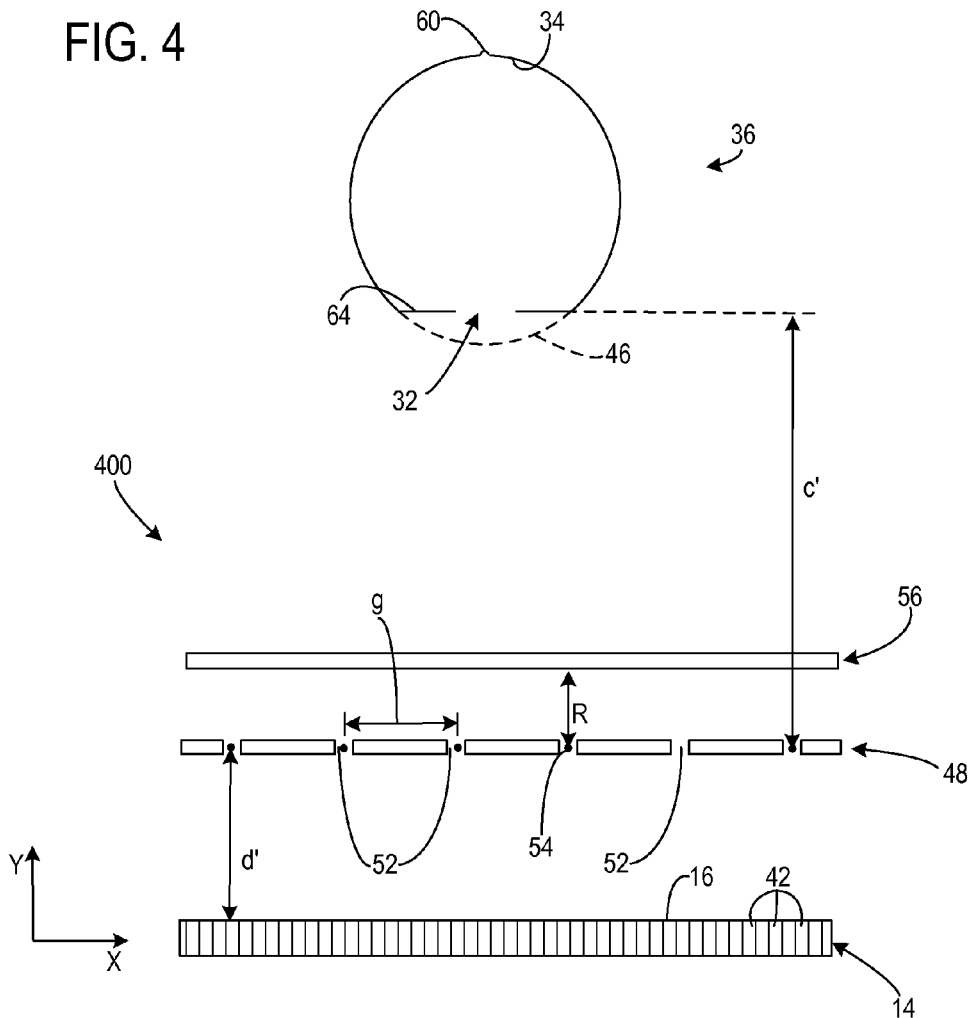
FIG. 4 is a schematic illustration of a top view of a near-eye display system according to another embodiment of the present disclosure.
Figure 6:
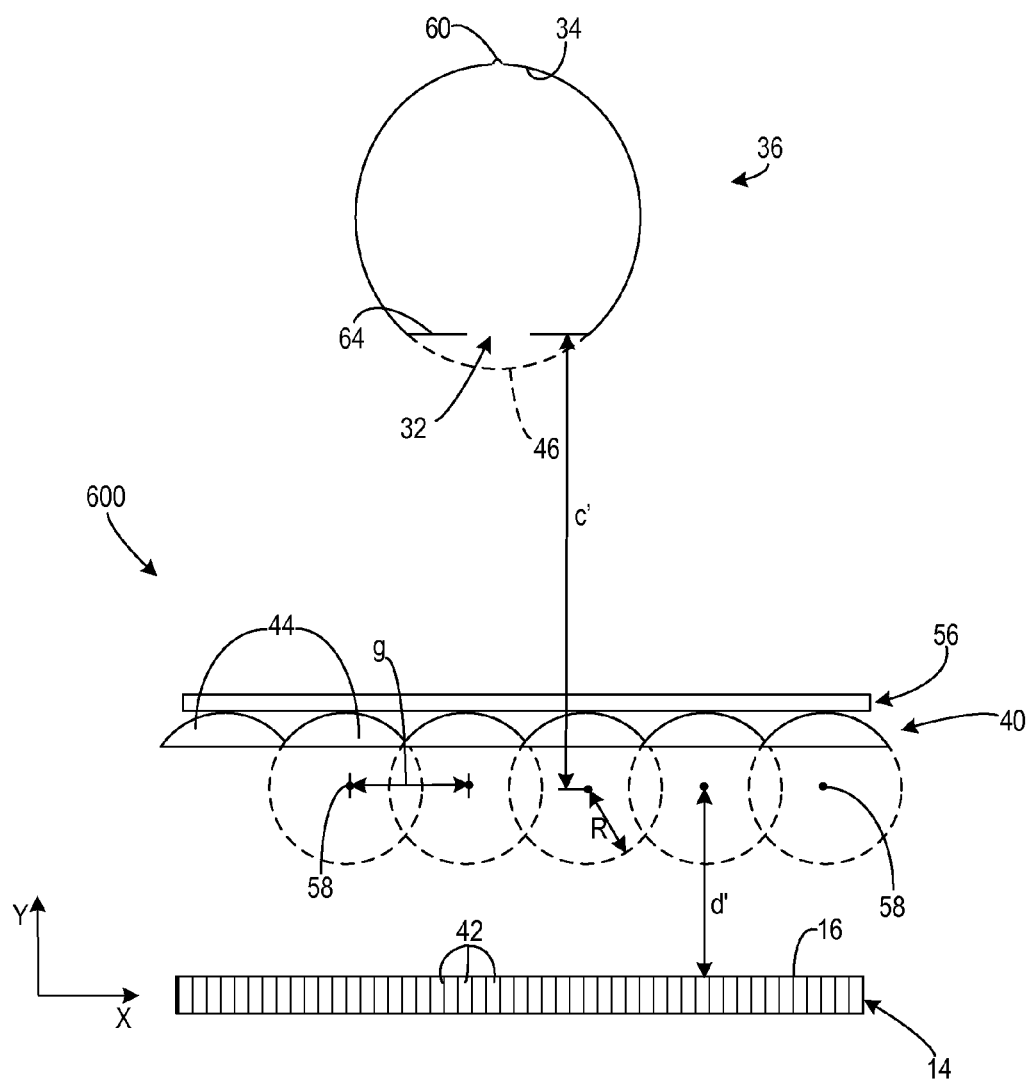
FIG. 6 is a schematic illustration of a top view of a near-eye display system according to another embodiment of the present disclosure.
Figure 7:
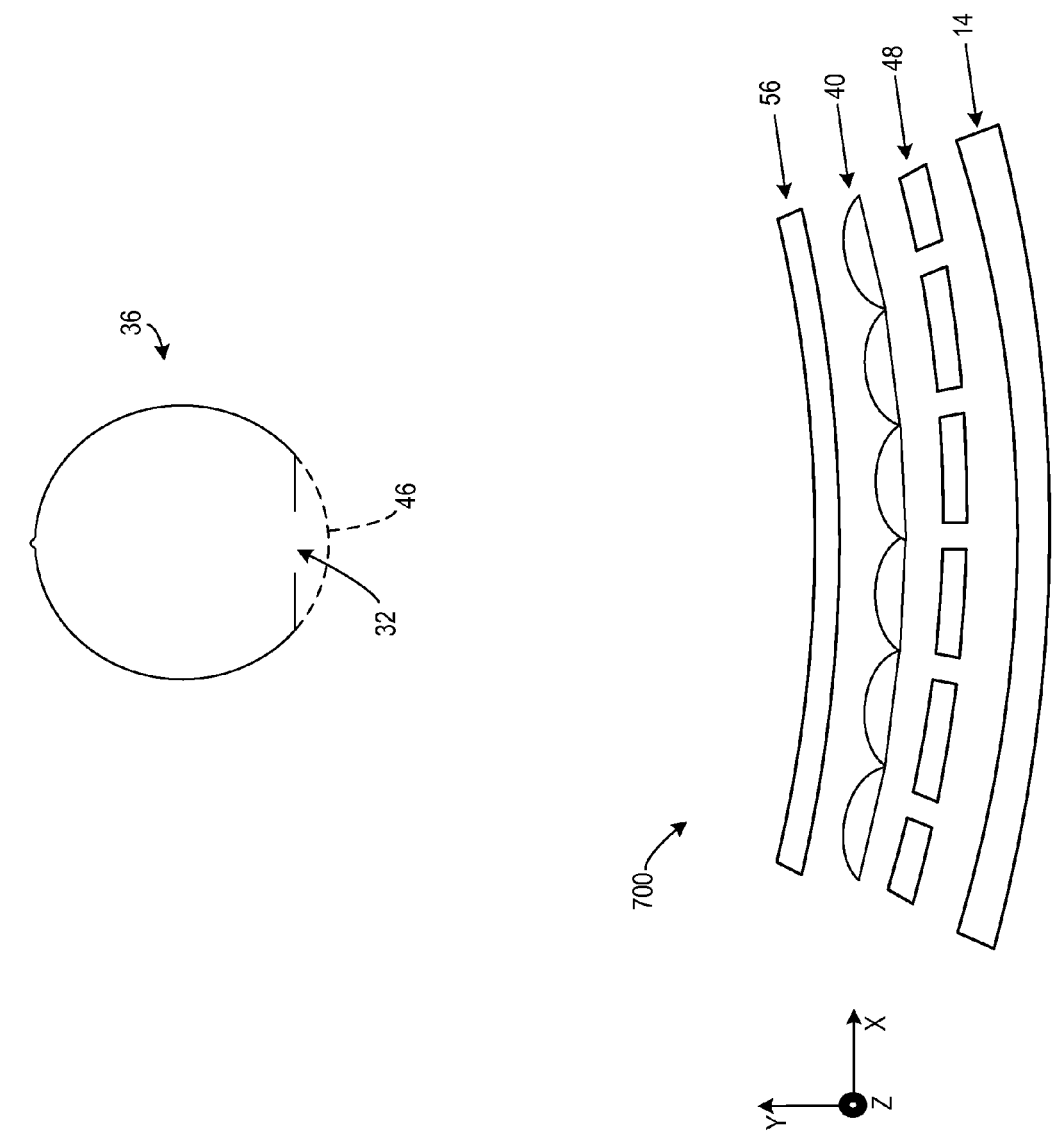
FIG. 7 is a schematic illustration of a top view of a near-eye display system according to another embodiment of the present disclosure.

Other example embodiments of near-eye display systems of the present disclosure are presented in FIGS. 4, 6 and 7. For example, FIG. 4 shows a near-eye display system 400 that utilizes an openings array 48 without a lens array. FIG. 6 shows a near-eye display system 600 that utilizes a lens array 40 without an openings array. FIG. 7 shows a near-eye display system 700 in which various components of the system may be curved in two dimensions or three dimensions.

As shown in FIG. 1, in some examples the near-eye display system 10 may be operatively connected to a computing device 18 using a wired connection, or may employ a wireless connection via WIFI, BLUETOOTH, or any other suitable wireless communication protocol. As described in more detail below, in some examples the near-eye display system 10 may include a multiplexing program 20, eye-tracking program 22, and rendering program 24 that may be stored in mass storage 26 of computing device 18. The multiplexing program 20, eye-tracking program 22, and/or rendering program 24 may be loaded into memory 28 and executed by a processor 30 of the computing device 18 to perform one or more of the methods and processes described in more detail below.

Figure 2:
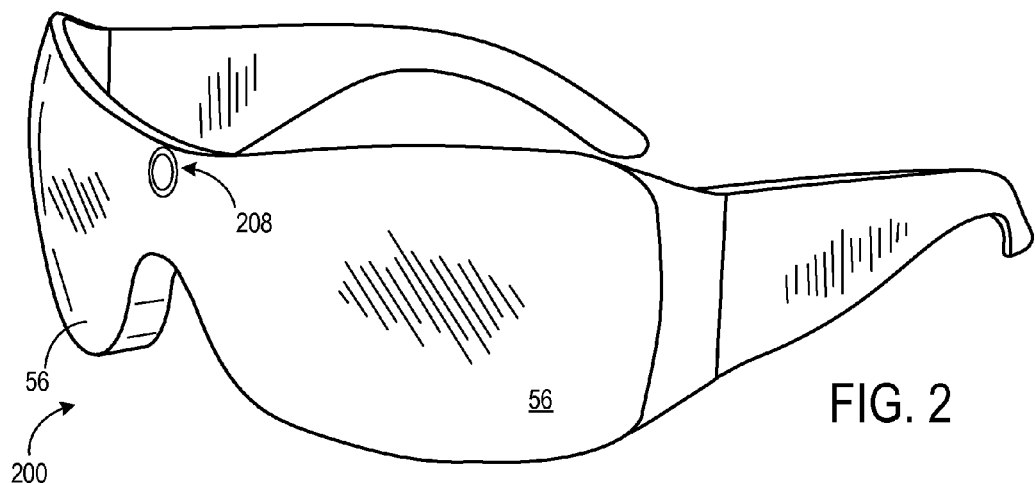
FIG. 2 shows an example near-eye display device according to an embodiment of the present disclosure.

FIG. 2 shows an example of a pair of wearable glasses 200 with which the various examples of the near-eye display system of the present disclosure may be used. It will be appreciated that the wearable glasses 200 may take other suitable forms in which a display is supported in front of a viewer's eye or eyes. It will also be appreciated that the various examples of the near-eye display system of the present disclosure may take the form of the wearable glasses 200 or any other suitable form factor.

In examples utilizing the multiplexing program 20, eye-tracking program 22, and/or rendering program 24, the computing device 18 may be integrated into or separate from the wearable glasses 200. In examples where the computing device 18 may be separate from the wearable glasses 200, the computing device may take the form of a desktop computing device, a mobile computing device such as a smart phone, laptop, notebook or tablet computer, mobile communications device such as a mobile phone, network computer, home entertainment computer, interactive television, gaming system, or other suitable type of computing device. Additional details regarding the components and computing aspects of the computing device 18 are described in more detail below with reference to FIG. 9.

With reference to example shown in FIG. 1, in some examples the light source 14 may comprise an Organic Light Emitting Diode (OLED) display that includes multiple image-producing elements in the form of light-emitting pixels 42 that emit light in response to an electric current. Each of the pixels 42 may have a pixel pitch of less than 5 microns. For purposes of the present disclosure, where a pixel 42 and its surrounding dead area occupy a square, the pixel pitch of the pixel may be defined as the side-length of the square. It will be appreciated that any other suitable display technologies capable of providing a desired pixel pitch, brightness, form factor, and other relevant qualities may be utilized for the light source 14.

In a more particular example, the light source 14 may comprise an OLED display that includes pixels 42 having a pixel pitch of approximately 4.7 microns. It will be appreciated that a pixel pitch of approximately 4.7 microns results in a pixel density of approximately 4.5 mega-pixels per square centimeter, which is significantly beyond typical print resolutions and portable display resolutions.

To facilitate description of the various embodiments of the near-eye display system of the present disclosure, the following discussion of aspects of a human vision system and optical component design considerations is provided. In human vision, a visual acuity of 20/20 means that a human eye can discriminate between two points separated by 1 arc minute, or 1/60th of a degree, which is also equivalent to an angular resolution of 30 cycles per degree. As one example, a visual angle of 1 arc minute seen from a distance of approximately 30 cm corresponds to a pixel pitch of approximately 89 microns.

With reference to the eye 36 shown in FIG. 1, it will be appreciated that light rays directed at the eye 36 and emanating from a point near the eye will naturally enter the pupil 32 over its entire area. Such rays, however, will not be sufficiently refracted when they reach the cornea 46, and accordingly will impinge upon a large area of the retina 34. For rays to converge on a single point on the retina 34, the rays are constrained to be nearly parallel when they reach the cornea 46. For example, such rays may be nearly parallel if they originated from a point source 10 cm away or perhaps further to avoid eye strain.

Another possibility for making the bundle of rays have a smaller angular spread would be to locate directly in front of the pupil 32 a hole that is smaller than the pupil. Among other characteristics, such a design would trade less light intensity for a larger depth of field. In the limit of an infinitesimally small hole, the eye 36 may see in focus at any distance (even concurrently). Accordingly, in this example a light source may be located directly in front of the eye 36, and the eye may still see light from the display in focus, provided the display can generate a sufficient amount light. A small lens having a very high curvature may also be positioned over the hole, which would allow more light in while maintaining focus near the eye. A tradeoff with this approach, however, would be that the focus would be limited to the location targeted by the small focal length of the lens.

Given the above considerations, one possible approach would be to incorporate a hole as part of the light source. However, a single hole on the light source creates a usability issue in that the eye 36 will move away from it when rotating to look at a different object. Accordingly, multiple holes may be considered. However, if two or more holes are provided, then a double image condition would be created from light sources near the eye 36. A double image condition may be defined as the perception of two images that are displaced horizontally, vertically, or diagonally in relation to each other. Such double images would be created because the light source would supply light through each of the multiple holes, with the light impinging upon the retina 34 at multiple different locations. Another reason for this double image condition in this example is that the distance between the pupil 32 and the holes is not sufficient relative to the distance between light source and the holes (for a given interspacing between the holes).

With reference now to FIGS. 1 and 3-7, descriptions of embodiments of the near-eye display system according to the present disclosure will now be provided. As explained in more detail below, the near-eye display system advantageously displays images without a double image condition. In some embodiments, the near-eye display system may function to avoid a double image condition while also reducing diffraction. For ease of description, the following examples are presented with respect to one eye 36 of a user, which may be the user's left eye or right eye. It will be appreciated that the near-eye display system may operate to display images concurrently to both eyes of a user.

As discussed in more detail below, in the examples of FIGS. 1 and 3-7 the near-eye display system comprises a light source 14, a standoff surface 56, and one or both of a lens array 40 and an openings array 48. For purposes of the present disclosure, an opening 52 in the openings array 48 may be defined as an aperture. Additionally, a lens 44 in the lens array 40 may be defined as creating an aperture.

Accordingly and for purposes of the present disclosure, the term "aperture" includes but is not limited to an opening 52 and a lens 44.

With reference to the near-eye display system 10 shown in FIG. 1, each of the light source 14, openings array 48, lens array 40 and standoff surface 56 extends linearly in a lateral direction parallel to the x-axis. It will be appreciated that in other examples, each of the light source 14, openings array 48, lens array 40 and standoff surface 56 may be curved in two dimensions or three dimensions. For example and with reference to the near-eye display system 700 shown in FIG. 7, each of the light source 14, openings array 48, lens array 40 and standoff surface 56 may be curved with respect to the x-axis and y-axis, or with respect to the x-axis, y-axis and z-axis. In some examples, one or more of the light source 14, openings array 48, lens array 40 and standoff surface 56 may have a radius of curvature that is centered on the rotational center of the eye 36.

As noted above, 20/20 visual acuity may be defined as one minute of arc or 1/60th of a degree. These measurements relate to the region inspected by the center of the fovea 60, which subtends an angle of around one degree. This may be considered a limit of travel, as the eye 36 will rotate so that the fovea 60 can inspect any region out forward from its center of rotation. It will also be appreciated that the eye 36 is capable of rotation over an angular range that is approximately 90 degrees.

Providing a high angular light density over approximately 90 degrees would necessitate a total number of light source pixels of 90*60=5400 pixels, or approximately 29,000,000 pixels to cover the corresponding square. It will be appreciated that 29 megapixels (MP) is a substantially larger number of pixels than current tablet and smartphone displays may render. Advantageously and as described in more detail below, the configuration of the near-eye display system of the present disclosure may utilize a pixel density far below 29 MP by enabling the eye 36 to focus on the generated light.

As discussed above, an example pixel pitch for an OLED display is 4.7 microns. Such a pixel pitch enables pixel cones corresponding to each pixel 42 of the light source 14 to be located as close as approximately 16 mm from the center of the pupil 32 while still enabling full 20/20 visual acuity. As this 16 mm distance is between the light source 14 and the pupil 32, the distance between the light source and the cornea 46 will be even smaller, for example approximately 12 mm. Accordingly, the standoff surface 56 may be located at least approximately 4 mm or more away from the pupil 32.

A consideration that arises when providing the lens array 40 between the light source 14 and the eye 36 is that the relevant pixel cones become the pixel cones with respect to each lens 44 in the lens array as opposed to the pupil 32. Where the lenses 44 are closer to the light source 14 than to the pupil 32, resolution at the pupil of the image produced by the light source suffers. Advantageously and as explained in more detail below, the components and layout of the near-eye display systems of the present disclosure address this consideration while also achieving sufficient effective resolution.

Figure 3:
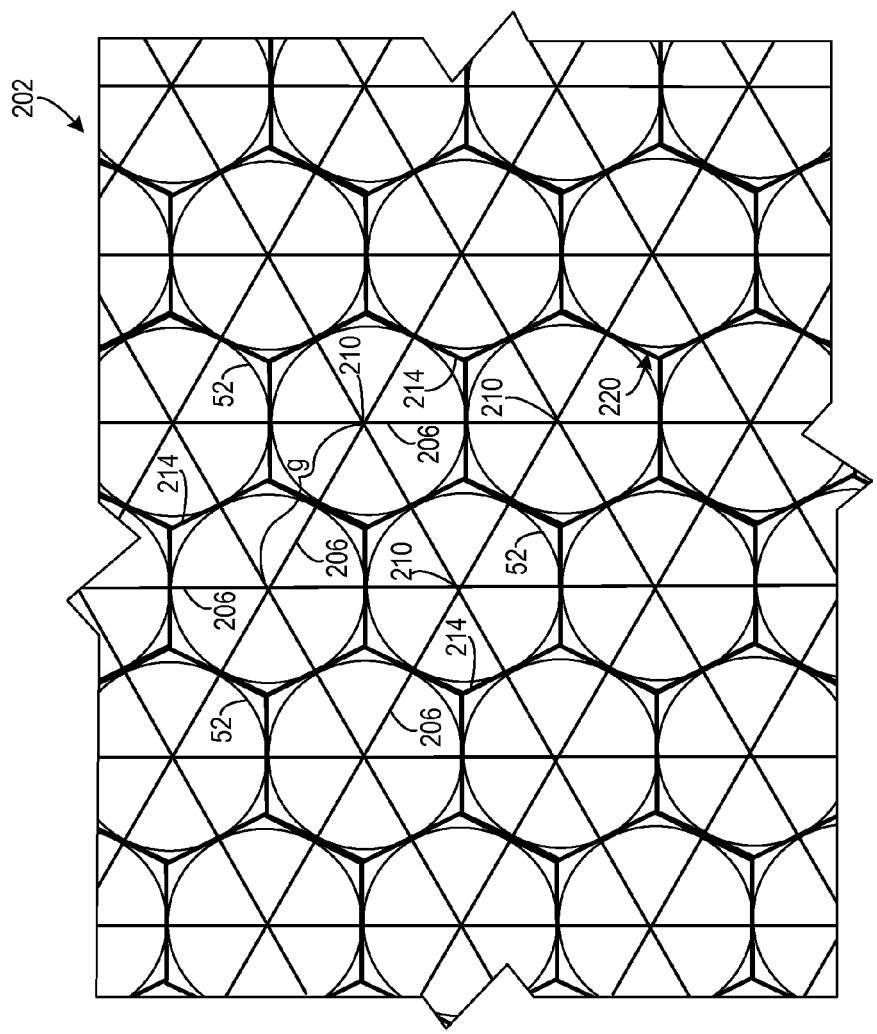
FIG. 3 is a schematic illustration of a portion of an aperture layout within a grid of equilateral triangles and hexagons according to an embodiment of the present disclosure.

With reference now to FIG. 3, a layout of the openings 52 in the openings array 48 and the lenses 44 in the lens array 40 may advantageously maximize the amount of light delivered from the light source 14 through the openings array to the lens array, and through the lens array to the eye 36. Further, and as described in more detail below, such a layout in combination with other features of the near-eye display system may avoid creating double images while also reducing diffraction.

For ease of description of the layouts shown in FIG. 3, the following discussion refers to the example near-eye display system 400 shown in FIG. 4 in which an openings array 48 is located between the light source 14 and the eye 36, and a separate lens array is not utilized. It will be appreciated that the lenses 44 in the lens array 40 of other embodiments may also be located according to the layout shown in FIG. 3 and described below.

With reference now to FIG. 4, ray-tracing back from the pupil 32 through one of the openings 52, the image of the boundary of the pupil will be approximately a circle. Accordingly, the light emitted from the pixels 42 that contributes to the portion of an image that passes through an opening 52 will be generally circular as viewed from the eye 36. Accordingly, in this example each of the openings 52 may be circular. It will also be appreciated that in some examples each opening 52 in the openings array 48 contains fluid, such as atmosphere, through which light emitted from the pixels 42 passes.

To maximize a quantity of light provided by the pixels of the light source 14, and with reference to now FIG. 3, in one example a grid 202 comprising equilateral triangles 206 may be utilized. As schematically illustrated in FIG. 3, each side of each equilateral triangle 206 is also a side of an adjacent equilateral triangle. Additionally, each vertex 210 of each equilateral triangle 206 is also a vertex of five other triangles. Using the grid 202 as a reference, the array 48 of non-overlapping circular openings 52 may be configured such that each opening is centered on a vertex 210 of a triangle 206 within the grid. Alternatively expressed, the centers 54 of each circular opening 52 may be located at a vertex 210 of an equilateral triangle 206 within the grid 202.

Additionally and as schematically illustrated in FIG. 3, each of the non-overlapping circular openings 52 may be configured such that each opening is bounded by a hexagon 214 that is centered on a vertex 210 shared by 5 triangles 206 within the grid 202. As explained in more detail below, the side length g of each equilateral triangle 206 may determine the layout of the openings 52 and the location of the hexagons 214 within the grid 202. The side length g of each equilateral triangle 206 may also be characterized as an aperture spacing.

With continued reference to FIGS. 3 and 4, one consideration in determining the side length g of each equilateral triangle 206 is maximizing coverage on the retina 34 of the generally circular portions of light projected through each opening 52. Alternatively expressed, the side length g may be determined such that any gaps between circles projected on the retina 34 are minimized or eliminated.

It will be appreciated that the distance from the center of an equilateral triangle to the corners of the triangle is $$\frac{1}{\sqrt{3}} * g,$$

where g=the side length of the triangle. To cover an equilateral triangle with circles centered on its vertices, each side length g will be no more than $\sqrt{3}*r$, where r is the circle radius. Accordingly, projections of light from the openings 52 may leave no gaps between them on the retina 34 if the side length g of the triangles in the grid 202 is less than or equal to √3 times the radius of the pupil 32 (or approximately 0.866 times the diameter of the pupil).

In this manner, it will be appreciated that the near-eye display system 10 including an array 48 of openings 52 that are located utilizing a side length g that is less than or equal to √3 times the radius of the pupil 32 may project multiple portions of light from the openings 52 that leave no gaps between the portions on the retina 34. Advantageously, it will also be appreciated that achieving full coverage on the retina 34 in this manner does not depend on the distance from the array 48 of openings 52 to the pupil 32, or on the distance from the pupil 32 to the surface 16 of light source 14.

The diameter of the pupil 32 may be considered to have a nominal value of 4 mm, but may vary with lighting from approximately 2 mm to approximately 8 mm. Accordingly, to accommodate a 2 mm pupil diameter, the side length g of the triangles 206 may be no longer than 0.866*2 mm=1.7 mm. To accommodate an 8 mm pupil diameter, the side length g of the triangles 206 may be no longer than 0.866*8 mm=6.9 mm. In one example, a design margin may be added to the side length g such that g may range between 1 mm and 9 mm. In another example, a design margin may be added to the side length g such that g may range between approximately 1 mm and approximately 9 mm.

With reference now to the example near-eye display system 10 shown in FIG. 1, the openings array 48 may be located closer to the surface 16 than to the pupil 32. The near-eye display system 10 of FIG. 1 also includes the lens array 40 of non-overlapping lenses 44, such as micro-lenses, located between the openings array 48 and the eye 36. With reference also to FIG. 3, in the discussion below the following parameters will be considered: the side length g of the triangles 206 in the grid 202, the y-axis distance d between the surface 16 and an outer surface 66 of the lens 44, the y-axis distance c between the plane 64 of the pupil 32 and the outer surface 66 of the lens 44, a pupil diameter p (in the rendering moment), and a retina limit r (defined as the smallest distance from the pupil at which the light source 14 can deliver full resolution).

It will be appreciated that the side length g may correspond to the x-axis distance between the centers 54 of adjacent openings 52, and/or to the x-axis distance between the centers 58 of the radii of adjacent lenses 44. In example shown in FIG. 1, it will be appreciated that the centers 54 of adjacent openings 52 and the centers 58 of the radii of adjacent lenses 44 are co-located in the same location. Additionally, in other examples discussed below a distance d' may be defined as the y-axis distance between the surface 16 and either the center 58 of the radius of a lens 44 or the center 54 of an opening 52. Each of distances d and d' may also be characterized as an aperture distance. Additionally, in other examples discussed below a distance c' is defined as the y-axis distance between the plane 64 of the pupil 32 and either the center 58 of the radius of a lens 44 or the center 54 of an opening 52.

As discussed above, 16 mm may be a minimum allowable distance between the light source 14 and the pupil 32 of eye 36 to enable 20/20 human visual acuity (without utilizing an openings array 48). Accordingly, the distance c may be controlled to be no smaller than prescribed by providing a standoff surface 56, such as a glass or polycarbonate surface, on a side of the lens array 40 closest to the eye 36. Such a standoff surface 56 may also function to protect the lens array 40 from damage.

It is desirable to avoid the condition in which rays from a particular pixel 42 of the light source 14 reach the retina 34 by traveling through two different openings 52. If this condition exists, then a double image condition would be generated from that pixel 42 in a manner that is not resolvable by choosing the color of that pixel. The pixel 42 would simply contribute the same color to two different places on the retina 34 since it sends light through two different openings 52. Such light will comprise at least two rays at different angles that both enter the pupil 32. In this case, the refraction in the eye 36 would be insufficient to focus the two rays back onto the same point on the retina 34.

The foregoing leads to the following geometric relationship that may be utilized to avoid double images:

$$g/d > p/(c+d)$$

Another consideration is the largest potential pupil diameter p that may be encountered. In the present example, 8 mm may be a maximum pupil diameter p as mentioned above. Because g is desirably no larger than $$\frac{\sqrt{3}}{2}$$

times the minimum $p_{min}$ (which is 2 mm in the present example), it follows that $$\frac{\sqrt{3}}{2} * 2\,\text{mm} * (c+d)/d > 8\,\text{mm},$$

or in other words that $(c+d)/d$ is desired to be larger than $$\frac{8}{\sqrt{3}} = 4.6.$$

Alternatively expressed, the ratio $$\frac{8}{\sqrt{3}}$$

may be reciprocated and the distance d between the surface 16 and an outer surface 66 of the lens 44 may be provided to be less than 0.22 of the distance between the surface 16 and the pupil 32. This may be summarized as the inequality $d/(c+d) < \sqrt{3} * p_{min}/2p_{max}$, or more generally, $g < \sqrt{3} * p_{min}/2$ and $d/(c+d) < g/p_{max}$.

In some examples, margins may be added to the parameters to address one or more other considerations, such as manufacturing constraints, engineering considerations, etc. For example, the value of g may be reduced from the particular value that is given by the equation $g < \sqrt{3} * p_{min}/2$. In another example, the value of the ratio $d/(c+d)$ may be decreased slightly below the particular value given by the equation $d/(c+d) < g/p_{max}$.

To minimize the thickness of the near-eye display system 10, it may be desirable to locate the standoff surface 56 as close as possible to the lens array 40, such as abutting the standoff surface against the outer surface 66 of the lenses as shown in FIG. 1. In this example, a value $c_{min}$ may be utilized for c in the above equations, where $c_{min}$ represents a minimum distance between the pupil 32 and an outer surface 66 of a lens 44. The value $c_{min}$ includes (a) a thickness of the standoff glass (for example, 1 mm), (b) the clearance between the standoff glass and the eye lashes of eye 36 (for example, 2 mm), (c) the extruded length of the eye lashes (for example, 4 mm), and (d) the distance between the tip of the cornea 46 and the pupil 32 (for example, 3 mm). The foregoing leads to $c_{min}$=10 mm. The distance d between the surface 16 and the outer surface 66 of a lens 44 may then be determined by solving for d in the formula $d/(c_{min}+d)<g/p_{max}$, yielding:

$$d<g_{cmin}/(p_{max}-g)$$

To summarize values obtained in the above examples: $c_{min}$=10 mm, $p_{min}$=2 mm, and $p_{max}$=8 mm. Additionally, the following formulas may be utilized to establish a side length g of the triangles 206 in the grid 202, and a distance d between the surface 16 of the light source 14 and the outer surface 66 of a lens 44 in lens array 40:

$$g = \sqrt{3} * \frac{p_{min}}{2}$$

$$d = \frac{c_{min}}{\frac{p_{max}}{g}-1}$$

Using the values $c_{min}$=10 mm, $p_{min}$=2 mm, and $p_{max}$=8 mm in the above formulas yields g=1.73 mm and d=2.76 mm. In other embodiments utilizing other values for $c_{min}$ and $p_{max}$, distance d may vary between 2 mm and 5 mm. In still other embodiments, distance d may vary between approximately 2 mm and approximately 5 mm.

Advantageously, the near-eye display system 10 shown in FIG. 1 enables rays from a particular display pixel 42 to be viewed sequentially through different openings 52. Correspondingly, the system 10 does not allow rays from a particular display pixel 42 to be viewed through different openings 52 concurrently. In this manner, the near-eye display system of the present disclosure differs from other display systems such as lenticular or regular lens array display designed for remote viewing. Additionally, the near-eye display system of the present disclosure advantageously provides a frustum of view that does not vary with the viewing direction.

Another difference between the near-eye display system of the present disclosure and other display systems in which a single piece of optics enables the eye to focus on a near eye display will now be described. In such other display systems, the optics may make the image appear to be pushed off into the distance, such that when the eye rotates, a particular pixel projects into the eye as if the pixel was at the same distance as the focus distance apparent to the eye (such as, for example, several meters).

Advantageously, the near-eye display system of the present disclosure avoids this condition. Instead, as the eye 36 rotates the rays from a display pixel 42 behave as if they originate from a source 16 mm (or less) from the pupil 32 of the eye 36. In this manner, a user experience is created in which the user's eye 36 is able to focus on a point that is, for example, 16 mm or less away from the pupil 32. Concurrently, the apparent focus distance to the eye that is perceived by the user is controlled to be a different distance that is selected by selecting the focal length of the lenses 44. As the eye 36 rotates, a ray projected by a particular display pixel 42 switches between openings 52 and moves on the retina 34 as if it projects in from, for example, 16 mm.

In some examples this experience may be interpreted by the user's vision system as the point simply moving when the eye moves. Additionally, it is not possible for both eyes to verge on the same point at 16 mm away from the pupil 32. Accordingly, in some examples the near-eye display system of the present disclosure may adapt the rendering of display pixels 42 based on the location of the eye 36 to make the rendered image appear to stay fixed at a larger distance than the actual distance of the surface 16 from the pupil.

As noted above, to track the position of the eye 36 and more particularly the pupil 32, in some examples the near-eye display system 10 may utilize an eye-tracking system including an eye-tracking program 22. With reference now to the wearable glasses 200 in FIG. 2, in one example an eye-tracking system may utilize at least one inward facing sensor 208. The inward facing sensor 208 may be an image sensor that is configured to acquire image data from a user's eyes in the form of one or more eye-position parameters.

Provided the user has consented to the acquisition and use of this eye-position information, the eye-tracking program 22 may use this information to track the position and/or movement of the user's eyes. For example, the eye-tracking system may track a position of a user's eye within an eyebox, measure or estimate a distance from the center of the pupil 32 to a location on wearable glasses 200, measure or estimate the interpupillary distance (IPD) between the center of the pupils of the user's eyes, measure or estimate a line of sight of the user's eyes, and measure or estimate other eye-position parameters related to the user's eyes. Using eye location information obtained from the eye-tracking program 22, the rendering program 24 may control the light source 14 to adapt the rendering of display pixels 42.

With reference now to FIGS. 1, 4 and 6, in these examples the light source 14 and the standoff surface 56 extend linearly in a lateral, x-axis direction parallel to one another. In FIGS. 1 and 4, the openings array 48 also extends linearly in a lateral, x-axis direction and parallel to the light source 14 and the standoff surface 56. In FIGS. 1 and 6 the lens array 40 also extends in the x-axis direction parallel to the standoff surface 56. Following is a discussion of design considerations and conditions described above as they may relate to the planar and parallel surfaces and components of the examples shown in FIGS. 1, 4 and 6.

With respect to the distance c' between the plane 64 of the pupil 32 and the center 54 of openings 52, it will be appreciated that resolution may be reduced as an opening 52 is moved closer to the surface 16 of light source 14. To address such an effect, the openings array 48 may be adapted. In one example and with reference also to FIG. 5, the openings array 48 may comprise a liquid crystal shutter display 502. In this example, each of the openings 52 may comprise a liquid crystal shutter 506, and temporal multiplexing may be utilized to control the opening and closing of the shutters.

Advantageously, by controlling the shutters via temporal multiplexing, light emitted from the pixels 42 of the light source 14 may be selectively provided to the lenses 44 to increase an effective pitch of each of the lenses and increase an effective resolution of the near-eye display system 10. As noted above, in some examples the near-eye display system 10 may include a multiplexing program 20 that may control the shutters 506 via temporal multiplexing as described above.

Figure 5:
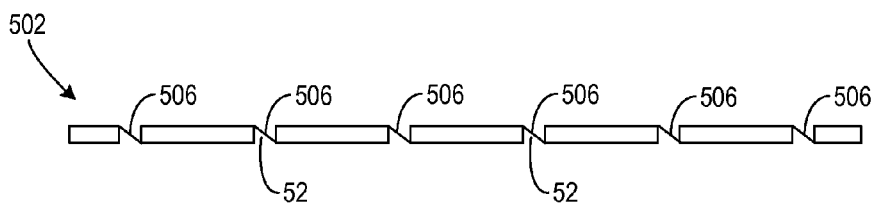
FIG. 5 is a schematic illustration of a shutter display.

In another example and with reference now to FIGS. 4 and 5, a near-eye display system 400 may include an openings array 48 without a separate array of lenses. In this example, a liquid crystal shutter display 502 may form the openings 52 as desired and control the openings over time using temporal multiplexing. Additionally, the shutter display 502 may be utilized in conjunction with an eye-tracking system as described above to adapt the openings to a current eye position.

As discussed above, moving the openings 52 away from the eye 36 helps to avoid double images arising from light rays from the same pixel passing through two different openings. Using adaptive openings 52 enabled by, for example, the shutter display 502, eye tracking may be utilized to target the fovea 60 with a single opening 52 that follows the center of the pupil 32.

As the visual axis is not the same as the optical axis, the opening 52 may follow a location slightly spaced from the center of the pupil 32. The opening 52 may also be located as close as possible to the eye 36, such as located just under the standoff surface 56. Advantageously, such an arrangement may provide enhanced resolution without producing a double image. Such an arrangement also centers over the fovea 60, which also addresses the potential issue of undesirable stiches in the rendering of the image that may arise from multiple openings 52 targeting the fovea 60.

Temporal multiplexing may also be used to address the user's peripheral vision as well. If temporal multiplexing is not used, the desirability of avoiding double image conditions may push the openings 52 too far apart to achieve coverage of the retina 34. Instead, in one example a separate time-slice may be created via temporal multiplexing to display an image using the array 48 of openings 52 at the distances and locations described above, but with a central region of the array shuttered out to avoid blurring the central region. This may produce full coverage of the retina 34 with a lower resolution, noting that lower resolution in the peripheral region of the retina is less objectionable.

A description of resolution and diffraction with respect to the near-eye display system of the present disclosure will now be provided. Three example factors that may affect the effective resolution of the near-eye display system are pixel angle, aperture angle, and diffraction limit. To consider these factors, the following parameters may be used:
  d: the distance between the display surface and an opening (for example, an opening 52);
  h: the pitch of a display pixel (for example, 4.7 microns);
  a: the opening diameter; and
  $\lambda$: the wavelength of the light (for example 700 nm, the upper limit of the visible spectrum).

The pixel angle may limit the resolution (stated in radians and assuming a small value) to h/d. The opening may be considered as a small circular hole in a very thin surface. The opening diameter a may also limit the resolution to a/d.

The angular range from a pixel through the opening (without considering diffraction) may be generally represented as (h+a)/d. For this reason and to avoid losing the resolution supported by the pixels, the opening diameter a may be as small as, or in some examples smaller than, the pixel pitch. On the other hand, as the diameter of the opening becomes smaller, diffraction as well as a loss of brightness may be experienced. Accordingly, these considerations related to the size of the opening may be balanced in the near-eye display system of the present disclosure.

It will be appreciated that diffraction spreads light through the opening and limits the angular resolution. The path difference for a shift s away from the central ray at distance c is:

$$\sqrt{c^2 + \left(s + \frac{a}{2}\right)^2} \cdot \sqrt{c^2 + \left(s - \frac{a}{2}\right)^2},$$

or $$\sqrt{c^2 + s^2 + sa + \frac{a^2}{4}} \cdot \sqrt{c^2 + s^2 - sa + \frac{a^2}{4}}$$

This may be approximated by the derivative of square root at $$c^2 + s^2 + \frac{a^2}{4}$$

(which is approximately $c^2$) times 2sa. This results in a path length difference of sa/c. Destructive interference may initially occur when this path length difference is the same as half the wavelength, or when $2sa/c=\lambda$. Two times the shift (both directions from the central ray) may be used over the distance, or 2s/c, to approximate the small angle in radians of the angular cone caused by diffraction. In summary, the angular resolution is limited by diffraction to $\lambda/a$. To find an opening diameter a that minimizes the maximum of $\lambda/a$ and a/d for a given wavelength and distance, the two ratios may be set equal, or $\lambda/a=a/d$, resulting in:

$$a=\sqrt{(\lambda d)}$$

Advantageously, the foregoing may provide a desirable opening diameter as a tradeoff between diffraction and aperture angle as seen from a point on the surface 16. If the pixel pitch may be made small enough, then the pitch h of a display pixel and the opening diameter a may be made equivalent, such that h=a. In this case, the diffraction-opening tradeoff may be a limiting factor. Accordingly, it is unnecessary for the display pixels to be any smaller than what can be resolved, and the effective angular resolution in radians is:

$$a/d=\lambda/a=\sqrt{(\lambda/d)}$$

In other examples where the pixel pitch may not be as small as desired, by selecting an appropriate opening diameter a, an image from the light source 14 on the retina 34 has greater resolution than the actual display pixel size may be achieved. In this example it will be appreciated that the pixel angle as seen from the opening (which may be increased by smaller display pixels and/or longer distance) may be a limiting factor. In this case, the opening diameter a may be increased until it approaches the display pixel size, since this increases brightness without affecting the limiting factor for resolution. Thus in this example, the opening diameter and the display pixel size may be equal, such that a=h.

In this example, the effective resolution is on the order of h/d. The cross-over between resolution limited by pixel angle and resolution limited by diffraction-aperture tradeoff occurs for a distance d such that:

$$h/d=\sqrt{(\lambda/d)} \text{ or } d=h^2/\lambda.$$

With the values recited above and using a distance d=12 mm, an opening diameter $a=\sqrt{(\lambda d)}=\sqrt{700nm \cdot 12mm}=92$ microns may be achieved from the diffraction-aperture angle tradeoff. In some examples the display pixels may be significantly smaller than 92 microns, such as 4.7 microns as noted above. In other examples the display pixels may be selected to be the same size as the opening diameter a, which yields an effective resolution of:

$$\sqrt{((jd))} = \sqrt{\frac{700nm}{12mm}} = 7.6 mrad.$$

The following table provides nonlimiting examples of effective resolutions for various distances between the surface 16 of light source 14 and the array 48 of openings 52 for two different pixel sizes, in examples of near-eye display systems of the present disclosure in which lenses are not utilized. The opening diameter for which this resolution is achieved is also shown. The second to last column shows the resolution that would be achieved where ideal optics are assumed and the openings are widened to avoid diffraction. The last column shows the opening diameter that corresponds to avoiding diffraction for the corresponding resolution:

| Distance d | Resolution 95 um pixels | Opening 95 um pixels | Resolution 4.7 um pixels | Opening 4.7 um pixels | Pixel angle limited 4.7 um pixels | Opening required to avoid diffraction a = (/θ) |
|---|---|---|---|---|---|---|
| 1 mm | 94.7 mrad | <95 um | 26.4 mrad | 26 um | 4.7 mrad | 148 um |
| 2 mm | 47.5 mrad | <95 um | 18.7 mrad | 37 um | 2.3 mrad | 304 um |
| 4 mm | 23.7 mrad | <95 um | 13.2 mrad | 53 um | 1.2 mrad | 583 um |
| 8 mm | 11.9 mrad | <95 um | 9.4 mrad | 75 um | 0.59 mrad | 1.2 mm |
| 12 mm | 7.9 mrad | <95 um | 7.6 mrad | 91 um | 0.39 mrad | 1.8 mm |
| 16 mm | 6.6 mrad | 106 um | 6.6 mrad | 106 um | 0.29 mrad | 2.4 mm |
| 20 mm | 5.9 mrad | 118 um | 5.9 mrad | 118 um | 0.23 mrad | 3.0 mm |
| 30 mm | 4.8 mrad | 145 um | 4.8 mrad | 145 um | 0.16 mrad | 4.3 mm |
| 40 mm | 4.2 mrad | 167 um | 4.2 mrad | 167 um | 0.12 mrad | 5.8 mm |
| 50 mm | 3.7 mrad | 187 um | 3.7 mrad | 187 um | 0.09 mrad | 7.8 mm |

In some examples, such as the near-eye display systems shown in FIGS. 1 and 6, one or more arrays of lenses 44 having spherical surfaces may be utilized. With reference to FIG. 1 and using an eyeball diameter of approximately 24 mm, the pupil 32 may rotate on a sphere of radius 12 mm. Using a standoff distance c of 10 mm, an outer surface 66 of lens array 40 is spaced 22 mm in the y-axis direction from the center of rotation of the eye.

In the hypothetical case of a planar surface extending in the x-axis direction through the location occupied by the outer surface 66 of each lens 44, the surface side length for a 90 degree coverage of the retina 34 is 44 mm. Using this distance of 44 mm, and with reference to FIG. 3 and the grid 202 having triangle side length g=1.76 mm, it will be appreciated that there are approximately 25 side lengths g of the grid spanning across the 44 mm distance. Alternatively expressed, there are approximately 25 diameters of lens hexagons spanning across the 44 mm distance.

In one example, lenses 44 having a largest-possible diameter for fitting within a hexagon 214 may be used. In this example it will be appreciated that the area between the circular circumference of the lenses that contacts the sides of each neighboring hexagon 214, where such area comprises opaque or partially opaque material, may block light from the light source 14. In this case, approximately $\Pi/\sqrt{12}=0.9$ of the light from the light source 14 will pass the array 40 of lenses 44, assuming that no light is lost to reflection.

In another example, a configuration of lenses 44 in the lens array 40 may address this consideration. In this example, lenses 44 have a spherical surface with a given curvature, and their material may be continued into the area between their circles. A point on the surface of a lens 44 may belong to the lens that is centered the closest (a Voronoi diagram may be used to determine the lens that is centered the closest). Each lens 44 then covers an area that under orthographic projection is an exact hexagon. The ends of adjacent hexagons will meet and the height at the hexagonal boundaries will be the same.

It will be appreciated that these conditions exist because each boundary is a boundary in the Voronoi diagram, and each boundary is equally spaced from two (or three) lenses 44. Further, the hexagonal boundary height falls off radially in the same manner for all lenses 44. It will be appreciated that the foregoing holds true even if the lens surfaces are not designed as part of the sphere. In this case, the lens surfaces may be designed as identical surfaces of revolution. In some examples, the underside of the array 40 of lenses 44 may have the same shape, or may extend all the way to the surface 16 of the light source 14.

The Lensmaker's equation may be used to determine a radius of the lenses 44:

$1/f=(n-1)[1/R_1 1-1/R_1 2+(n-1)h/(nR_1 1R_1 2)]$ where f is the focal length, n is the index of refraction, $R_1$ and $R_2$ are the radii of curvature of the lens surfaces closest and furthest from the light source 14, respectively, and h is the thickness of the lens along the optical axis. If one radius is infinite, then the equation becomes R=f (n−1) for the other radius. This indicates that the focal length is approximately equal to the diameter (assuming n=1.5).

In some examples the refraction index n of 1.585 for polycarbonate may be used. Where f=d=2.76 mm and n=1.585, then the radius R=1.61 mm. It will be appreciated that a radius R of 1.61 mm is somewhat similar to the triangle side length g=1.73 mm. This also results in a total height of the lens array film at the tips of 4.37 mm.

In another example, a lens array may utilize lenses that include spherical backs and open space between the light source 14 and the lens array. This example may be useful for a variable focus distance display. One example of a variable focus distance display may include a motor that moves the lens array or the light source in a manner similar to an autofocus mechanism utilized in some autofocus cameras.

It will also be appreciated that all points on the surface 16 of the light source 14 may not be in focus. As one rotates around the spherical surface of a lens 44, the focal distance calculation stays constant and the focus point moves around a sphere concentric with the lens surface, as opposed to staying on the display plane. For this reason, adjustments may be considered to mitigate this consideration. Such adjustments may include, for example, moving the focal length back a small amount and utilizing a non-spherical lens.

Another adjustment may include utilizing an openings array 48 between the lens array 40 an light source 14, as shown in the example of FIG. 1. This configuration may take advantage of an increase in the depth of focus provided by the openings array 48, while also increasing the supply of light without sacrificing focus or causing diffraction via the lens array 40. Such enhanced optical properties may also become increasingly desirable as the field of view increases.

Potential effects of spherical aberration with respect to the lens array 40 and the openings array 48 between the lens array and the light source 14 may also be considered. In some examples, an opening diameter a of less than approximately 20% of the lens radius may be utilized to advantageously avoid significant degrading of the user's visual acuity via spherical aberration. In other examples, an opening diameter that is approximately 30% of the lens radius may be used where user visual acuity may be slightly degraded for other reasons.

As explained above, in some examples providing a lens array 40 may increase the effective resolution of the near-eye display system. However, to avoid double images, an openings array 48 arranged according to the grid 202 of FIG. 3 may be moved away from the eye 36, resulting in lower resolution. Accordingly and as described above, in some examples temporal multiplexing of the openings 52 may also be utilized to increase resolution. By using temporal multiplexing, the openings 52 may be located closer to the eye 36 and thereby increase the effective resolution. In one example of temporal multiplexing using four separate passes, the effective diameter of the openings 52 that are active at a particular time may be doubled. Advantageously, this enables the openings 52 to be located closer to the eye 36 and doubles the effective resolution.

An example of the near-eye display system 10 shown in FIG. 1 will now be described. The light source 14 may include pixels 42 having 4.7 micron pitch. With reference to FIG. 3, an equilateral triangular grid 202 may include triangle side length g=1.73 mm. Accordingly, the centers 54 of adjacent openings 52 in the openings array 48 may be spaced by a distance g=1.73 mm. In this example, the location of each center 54 of an opening 52 is also the location of a center 58 of the radius R of a corresponding spherical lens 44 in array 40.

The surface 16 of light source 14 is spaced from the centers 58 of the spherical lenses 44 by a distance d'=2.76 mm. Assuming a minimum pupil diameter of $p_{min}$=2 mm, this configuration advantageously provides substantially full image coverage on retina 34. Further, assuming a maximum pupil diameter of $p_{max}$=8 mm and a minimum stand-off distance $c'_{min}$=10 mm from the centers 58 of the lenses 44, this configuration also advantageously avoids a double image condition. This example configuration also provides a resolution of 1.5 mrad based on the pixel angle limitation described above.

Using the distance d'=2.76 mm and an index of refraction n=1.5 that approximately corresponds to a polycarbonate material for the lenses 44, a radius R of each lens 44 may be determined by R=2.76 mm*(n−1)=1.38 mm. It will also be appreciated that a lens radius R=1.38 mm produces a focal length f=2.76 mm that is equivalent to the distance d'=2.76 mm. In other examples, a radius R of each lens 44 may be between approximately 1 mm and approximately 2 mm.

Additionally, to avoid diffraction further degrading the resolution and creating image distortion, the diameter a of each opening 52 may be at least a=λ/θ=700 nm/n*1.5 mrad=311 microns. As noted above, the center 54 of each opening 52 is located at the center 58 of the radius R of a corresponding spherical lens 44. An aperture ratio calculation that relates to the effects of spherical aberration on angular resolution is a/R. In the present example, a/R=0.311 mm/1.38 mm=0.225. To reduce effects of spherical aberration, approximately 1.5 times a/R may be used. Accordingly, a/R=1.5*0.225=0.338.

Spherical aberration at an aperture ratio a/R of approximately 0.4 is approximately 0.11 degrees or 1.7 mrad resolution. Spherical aberration at an aperture ratio of approximately 0.3 is approximately 0.04 degrees, corresponding to a resolution of approximately 1.5 mrad. With lens radius R=1.38 mm, adjacent opening spacing g=1.73 mm, and aperture ratio a/R=0.338 mm, a field of view that is approximately 90 degrees is created. Alternatively expressed, this configuration achieves at least approximately 90 degrees of coverage on the retina 34. Moving the openings 52 slightly toward the lenses 44, by 0.1 mm for example, and/or slightly increasing the opening spacing g may further widen the field of view and extend retinal coverage to approach or exceed 90 degrees.

In one example, the spacing g=1.73 mm may be increased by the aperture ratio a/R=0.338 mm to 1.73 mm+0.338 mm=2.068 mm, and still maintain retina coverage. It will be appreciated that 2.068 mm/√2=1.46 mm is a maximum lens radius R for a 90 degree field of view. Advantageously, because the lens radius R=1.38 mm in the present example, the 90 degree field of view target is achieved. It will also be appreciated that the resolution is unaffected to approximately 5-10 degrees from the fovea 60 and is reduced further in the periphery of the retina 34. It will also be appreciated that human visual acuity is also reduced in the periphery of the retina 34.

In another example, the outer surface of the spherical lenses 44 may continue for 360 degrees and pixels 42 from a correspondingly curved light source may be placed on the back of the spherical lenses. In another example, the lenses may include a diverging surface construction on the back side of the lens to allow increasing the distance a bit, which may further enhance resolution.

In one example of the near-eye display system 10 of FIG. 1, the system may have a thickness of 2.76 mm (d')+1.38 mm (R)+2 mm (thickness of the light source 14)+1 mm (thickness of the standoff surface 56)=7.14 mm. In one example in which the standoff surface thickness is 1 mm, the minimum standoff distance c' to the pupil 32 is 10 mm−1.38 mm−1 mm=7.62 mm.

Figure 8A:
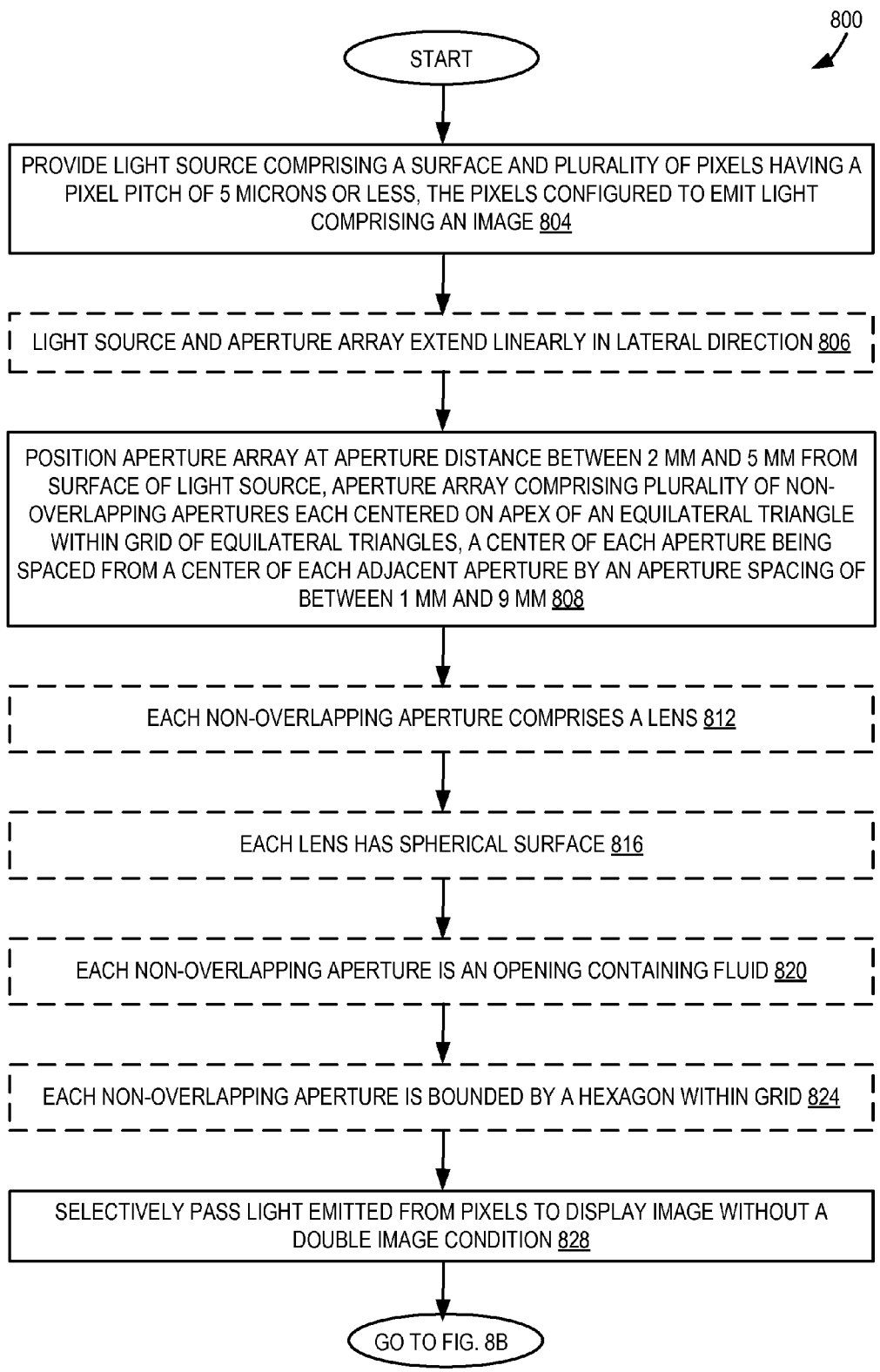
FIGS. 8A and 8B are a flow chart of a method for adjusting a location of a blocking image according to an embodiment of the present disclosure.
Figure 8B:
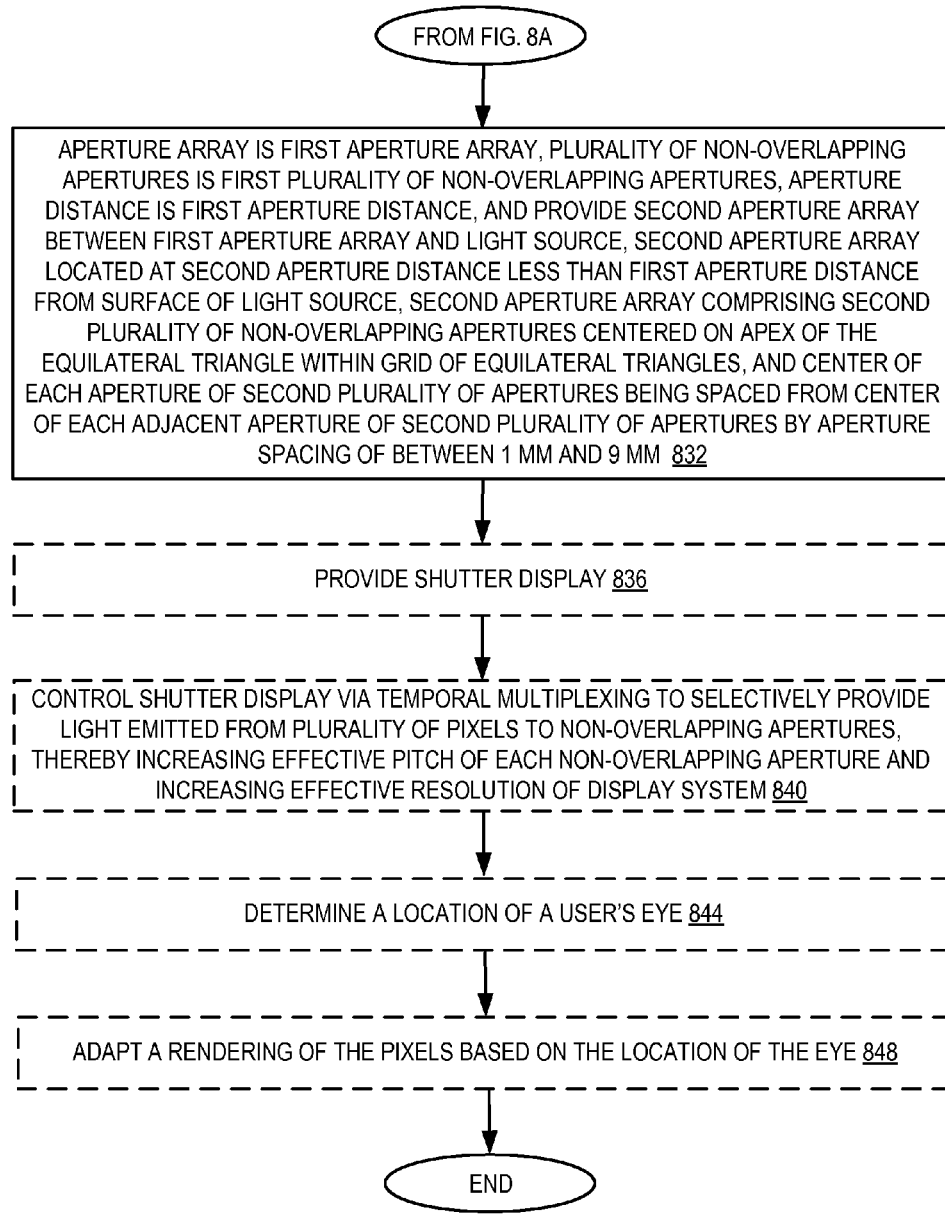

FIGS. 8A and 8B illustrate a flow chart of a method 800 for displaying an image. The following description of method 800 is provided with reference to the software and hardware components of the near-eye display systems described above and shown in FIGS. 1-7. It will be appreciated that method 800 may also be performed in other contexts using other suitable hardware and software components.

At 804 the method 800 may include providing a light source comprising a surface and a plurality of pixels having a pixel pitch of 5 microns or less, wherein the pixels are configured to emit light comprising an image. At 806 the light source and the aperture array may extend linearly in a lateral direction. At 808 the method 800 may include positioning an aperture array at an aperture distance of between 2 mm and 5 mm from the surface of the light source, the aperture array comprising a plurality of non-overlapping apertures that are each centered on a vertex of an equilateral triangle within a grid of equilateral triangles, and a center of each of the apertures being spaced from a center of each adjacent aperture by an aperture spacing of between 1 mm and 9 mm.

At 812 each of the non-overlapping apertures may comprise a lens. At 816 each of the lenses may have a spherical surface. At 820 each of the non-overlapping apertures may be an opening containing fluid, such as atmosphere. At 824 each of the non-overlapping apertures may be bounded by a hexagon within the grid. At 828 the method 800 may include selectively passing the light emitted from the pixels to display the image without a double image condition.

At 832, the aperture array may be a first aperture array, the plurality of non-overlapping apertures may be a first plurality of non-overlapping apertures, and the aperture distance may be a first aperture distance. The method 800 may include providing a second aperture array between the first aperture array and the light source, with the second aperture array located at a second aperture distance less than the first aperture distance from the surface of the light source. The second aperture array may comprise a second plurality of non-overlapping apertures that are each centered on the vertex of the equilateral triangle within the grid of equilateral triangles, and a center of each aperture of the second plurality of apertures may be spaced from a center of each adjacent aperture of the second plurality of apertures by an aperture spacing of between 1 mm and 9 mm.

At 836 the method 800 may include providing a shutter display. At 840 the method 800 may include controlling the shutter display via temporal multiplexing to selectively provide the light emitted from the plurality of pixels to the non-overlapping apertures, thereby increasing an effective pitch of each of the non-overlapping apertures and increasing an effective resolution of the display system. At 844 the method 800 may include determining a location of an eye of a user. At 848 the method 800 may include adapting a rendering of the pixels based on the location of the eye.

It will be appreciated that method 800 is provided by way of example and is not meant to be limiting. Therefore, it is to be understood that method 800 may include additional and/or alternative steps than those illustrated in FIGS. 8A and 8B. Further, it is to be understood that method 800 may be performed in any suitable order. Further still, it is to be understood that one or more steps may be omitted from method 800 without departing from the scope of this disclosure.

Figure 9:
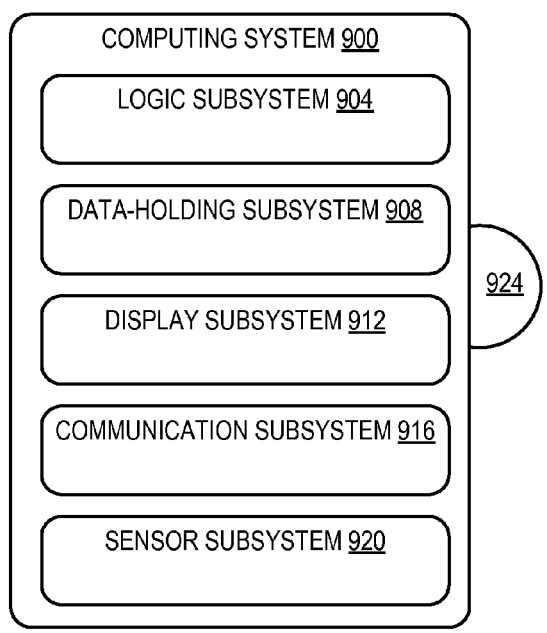
FIG. 9 is a schematic illustration of an embodiment of a computing device.

FIG. 9 schematically shows a nonlimiting embodiment of a computing device 900 that may perform one or more of the above described methods and processes. Computing device 900 is shown in simplified form. It is to be understood that virtually any computer architecture may be used without departing from the scope of this disclosure. In different embodiments, computing device 900 may take the form of a mainframe computer, server computer, desktop computer, laptop computer, tablet computer, home entertainment computer, network computing device, mobile computing device, mobile communication device, gaming device, etc. Computing device 900 may also be integrated into wearable glasses 200.

As shown in FIG. 9, computing device 900 includes a logic subsystem 904, a data-holding subsystem 908, a display subsystem 912, a communication subsystem 916, and a sensor subsystem 920. Computing device 900 may optionally include other subsystems and components not shown in FIG. 9. Computing device 900 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 904 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 904 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 908 may include one or more physical, persistent devices configured to hold data and/or instructions executable by the logic subsystem 904 to implement the herein described methods and processes. When such methods and processes are implemented, the state of data-holding subsystem 908 may be transformed (e.g., to hold different data).

Data-holding subsystem 908 may include removable media and/or built-in devices. Data-holding subsystem 908 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 908 may include devices with one or more of the following characteristics: volatile, nonvolatile, dynamic, static, read/write, read-only, random access, sequential access, location addressable, file addressable, and content addressable. In some embodiments, logic subsystem 904 and data-holding subsystem 908 may be integrated into one or more common devices, such as an application specific integrated circuit or a system on a chip.

FIG. 9 also shows an aspect of the data-holding subsystem 908 in the form of removable computer-readable storage media 924, which may be used to store and/or transfer data and/or instructions executable to implement the methods and processes described herein. Removable computer-readable storage media 924 may take the form of CDs, DVDs, HD-DVDs, Blu-Ray Discs, EEPROMs, and/or floppy disks, among others.

It is to be appreciated that data-holding subsystem 908 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 912 may be used to present a visual representation of data held by data-holding subsystem 908. Display subsystem 912 may include, for example, the light source 14 of the wearable glasses 200. As the above described methods and processes change the data held by the data-holding subsystem 908, and thus transform the state of the data-holding subsystem, the state of the display subsystem 912 may likewise be transformed to visually represent changes in the underlying data.

Communication subsystem 916 may be configured to communicatively couple computing device 900 with one or more networks and/or one or more other computing devices. Communication subsystem 916 may include wired and/or wireless communication devices compatible with one or more different communication protocols. As nonlimiting examples, the communication subsystem 916 may be configured for communication via a wireless telephone network, a wireless local area network, a wired local area network, a wireless wide area network, a wired wide area network, etc. In some embodiments, the communication subsystem may allow computing device 900 to send and/or receive messages to and/or from other devices via a network such as the Internet.

Sensor subsystem 920 may include one or more sensors configured to sense different physical phenomenon (e.g., visible light, infrared light, sound, acceleration, orientation, position, etc.). For example, the sensor subsystem 920 may comprise one or more eye-tracking sensors as described above. Sensor subsystem 920 may be configured to provide observation information such as eye-tracking information to logic subsystem 904, for example. As described above, in some examples observation information such as eye-tracking information may be used to perform the methods and processes described above.

The term "program" may be used to describe an aspect of the near-eye display system that is implemented to perform one or more particular functions. In some cases, such a program may be instantiated via logic subsystem 904 executing instructions held by data-holding subsystem 908. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A near-eye display system, comprising:
a light source comprising a surface and a plurality of pixels having a pixel pitch of 5 microns or less, wherein the pixels are configured to emit light comprising an image;
a first aperture array located at an aperture distance from the surface of the light source, the aperture distance between 2 mm and 5 mm, the first aperture array comprising a first plurality of non-overlapping apertures that are each centered on a vertex of an equilateral triangle within a first grid of equilateral triangles, a center of each of the first plurality of apertures being spaced from a center of each adjacent aperture by an aperture spacing of between 1 mm and 9 mm; and
a second aperture array between the first aperture array and the light source, the second aperture array comprising a second plurality of non-overlapping apertures,
wherein the first aperture array selectively passes the light emitted from the pixels to display the image without a double image condition, and wherein the plurality of pixels are greater in number than the first plurality of non-overlapping apertures.

2. The near-eye display system of claim 1, wherein the light source and the first aperture array extend linearly in a lateral direction.

3. The near-eye display system of claim 1, wherein the light source and the first aperture array are curved in two or three dimensions.

4. The near-eye display system of claim 1, wherein each of the first plurality of non-overlapping apertures is a lens.

5. The near-eye display system of claim 4, wherein each of the lenses has a spherical surface and a lens radius.

6. The near-eye display system of claim 1, wherein each of the first plurality of non-overlapping apertures is an opening containing fluid.

7. The near-eye display system of claim 1, wherein the aperture distance is a first aperture distance, and wherein the second aperture array is located at a second aperture distance less than the first aperture distance from the surface of the light source, the second plurality of non-overlapping apertures each centered on a vertex of an equilateral triangle within a second grid of equilateral triangles, and a center of each aperture of the second plurality of apertures being spaced from a center of each adjacent aperture of the second plurality of apertures by an aperture spacing of between 1 mm and 9 mm.

8. The near-eye display system of claim 1, wherein each of the first plurality of non-overlapping apertures is bounded by a hexagon within the first grid.

9. The near-eye display system of claim 1, further comprising:
a shutter display;
a processor; and
a multiplexing program comprising instructions executable by the processor to:
control the shutter display via temporal multiplexing to selectively provide the light emitted from the plurality of pixels to the non-overlapping apertures.

10. The near-eye display system of claim 1, further comprising:
a processor;
an eye-tracking program comprising instructions executable by the processor to determine a location of an eye of a user; and a rendering program comprising instructions executable by the processor to adapt a rendering of the pixels based on the location of the eye.

11. A method for displaying an image, comprising:
providing a light source comprising a surface and a plurality of pixels having a pixel pitch of 5 microns or less, wherein the pixels are configured to emit light comprising the image;
positioning an first aperture array at an aperture distance of between 2 mm and 5 mm from the surface of the light source, the first aperture array comprising a first plurality of non-overlapping apertures that are each centered on a vertex of an equilateral triangle within a first grid of equilateral triangles, a center of each of the first plurality of apertures being spaced from a center of each adjacent aperture by an aperture spacing of between 1 mm and 9 mm, wherein the plurality of pixels are greater in number than the first plurality of non-overlapping apertures;
positioning a second aperture array between the first aperture array and the light source, the second aperture array comprising a second plurality of non-overlapping apertures; and
selectively passing the light emitted from the pixels to display the image without a double image condition.

12. The method of claim 11, wherein the light source and the first aperture array extend linearly in a lateral direction.

13. The method of claim 11, wherein each of the first plurality of non-overlapping apertures is a lens.

14. The method of claim 13, wherein each of the lenses has a spherical surface.

15. The method of claim 11, wherein each of the first plurality of non-overlapping apertures is an opening containing fluid.

16. The method of claim 11, wherein the aperture distance is a first aperture distance, wherein the second aperture array is located at a second aperture distance less than the first aperture distance from the surface of the light source, the second plurality of non-overlapping apertures each centered on a vertex of an equilateral triangle within a second grid of equilateral triangles, and a center of each aperture of the second plurality of apertures being spaced from a center of each adjacent aperture of the second plurality of apertures by an aperture spacing of between 1 mm and 9 mm.

17. The method of claim 11, wherein each of the plurality of non-overlapping apertures is bounded by a hexagon within the grid.

18. The method of claim 11, further comprising:
determining a location of an eye of a user; and
adapting a rendering of the pixels based on the location of the eye.

19. The method of claim 11, further comprising:
providing a shutter display; and
controlling the shutter display via temporal multiplexing to selectively provide the light emitted from the plurality of pixels to the non-overlapping apertures.

20. A near-eye display system, comprising:
a light source comprising a surface and a plurality of pixels having a pixel pitch of 5 microns or less, wherein the pixels are configured to emit light comprising an image;
a first aperture array located at a first aperture distance from the surface of the light source, the first aperture distance between 2 mm and 5 mm, the first aperture array comprising a first plurality of non-overlapping apertures that are each centered on a vertex of an equilateral triangle within a first grid of equilateral triangles, a center of each of the apertures being spaced from a center of each adjacent aperture by an aperture spacing of between 1 mm and 9 mm; and
a second aperture array between the first aperture array and the light source, the second aperture array located at a second aperture distance less than the first aperture distance from the surface of the light source, the second aperture array comprising a second plurality of non-overlapping apertures that are each centered on a vertex of an equilateral triangle within a second grid of equilateral triangles, and a center of each aperture of the second plurality of apertures being spaced from a center of each adjacent aperture of the second plurality of apertures by an aperture spacing of between 1 mm and 9 mm, wherein the first aperture array and the second aperture array selectively pass the light emitted from the pixels to display the image without a double image condition.

21. The near-eye display system of claim 9, wherein the instructions are executable to control the shutter display via temporal multiplexing in a manner that increases an effective pitch of each of the non-overlapping apertures and increases an effective resolution of the display system.

22. The method of claim 19, further comprising increasing an effective pitch of each of the non-overlapping apertures and increasing an effective resolution of the display system by controlling the shutter display via temporal multiplexing.

* * * * *